United States Patent [19]
Ito et al.

[11] 4,106,040
[45] Aug. 8, 1978

[54] CAMERA HAVING IMPROVED MECHANISM FOR SHUTTER ACTUATION AND FILM WINDING

[75] Inventors: Fumio Ito; Tadashi Ito, both of Yokohama; Akio Sunouchi, Kawasaki; Kanehiro Sorimachi, Yokohama, all of Japan

[73] Assignee: Canon Kabushiki Kaisha, Tokyo, Japan

[21] Appl. No.: 810,969

[22] Filed: Jun. 28, 1977

Related U.S. Application Data

[63] Continuation of Ser. No. 558,731, Mar. 17, 1975, abandoned.

[30] Foreign Application Priority Data

| Mar. 20, 1974 | [JP] | Japan | 49/31741 |
| Mar. 20, 1974 | [JP] | Japan | 49/31742 |
| Apr. 16, 1974 | [JP] | Japan | 49/43052 |

[51] Int. Cl.² ............... G03B 17/42; G03B 17/38
[52] U.S. Cl. .................... 354/205; 354/234; 354/267
[58] Field of Search ............ 354/204, 205, 226, 227, 354/234–236, 238, 241–244, 246, 251, 258, 266–269

[56] References Cited

U.S. PATENT DOCUMENTS

| 3,645,182 | 2/1972 | Kimura | 354/205 |
| 3,646,867 | 3/1972 | Ono | 354/205 |
| 3,650,193 | 3/1972 | Shimizu | 354/234 |
| 3,688,674 | 9/1972 | Kuramoto et al. | 354/234 |
| 3,698,304 | 12/1972 | Tenkumo | 354/234 |
| 3,724,351 | 4/1973 | Matsumoto | 354/234 |
| 3,812,510 | 5/1974 | Aizawa et al. | 354/235 |

*Primary Examiner*—L. T. Hix
*Assistant Examiner*—William B. Perkey
*Attorney, Agent, or Firm*—Toren, McGeady and Stanger

[57] ABSTRACT

A camera of the type in which the shutter actuator is operated by means of an electromagnet or a permanent magnet associated with a solenoid has a film winding mechanism and a shutter tensioning mechanism operatively connected with each other through an improved interconnecting mechanism which includes a cam arrangement and a switching arrangement for the electromagnet or the solenoid. The cam arrangement is constructed as having complementary camming surfaces to facilitate the minimization of dimensions of the interconnecting mechanism. During the film winding or shutter tensioning operation, the electromagnet or the solenoid is rendered inoperative or operative respectively by the switching arrangement to thereby reduce the torque of a single operating member for the film winding and shutter tensioning mechanisms.

6 Claims, 6 Drawing Figures

4,106,040

CAMERA HAVING IMPROVED MECHANISM FOR SHUTTER ACTUATION AND FILM WINDING

This is a continuation of application Ser. No. 558,731 filed on Mar. 17, 1975, now abandoned.

BACKGROUND OF THE INVENTION

This invention relates to photographic a camera, and more particularly to a camera of the type having an electromagnetically controllable shutter release actuator and in which the shutter tensioning mechanism is operatively connected to the film winding mechanism so that a predetermined motion of a common operating member serves both to advance the film through the space of one frame and to tension the shutter.

Cameras of the type described are known in the art, and in many of the prior art constructions, the motion of the common or single operating member is transmitted to the shutter tensioning mechanism through a swingable member constructed, for example, in the form of a lever. In such a motion transmitting lever arrangement, the dimensions of the lever must be excessively increased in order to insure that the shutter tensioning mechanism is fully operated for the tensioning of the shutter. This large size lever structure is incompatible with compact camera structures incorporating therein other various complicated mechanisms.

On the other hand, the shutter tensioning mechanism is associated with an electromagnet or a permanent magnet which is adapted to control the shutter release actuator so that when the shutter tensioning operation is terminated, the shutter is held in a tensioned position. During the course of this operation, the magnet is allowed to exert a force against the motion of the shutter tensioning mechanism which in turn increases the torque of the single operating member. In recently developed cameras and particularly single lens reflex cameras, the motion of the single operating member serves not only to control the operation of the film winding and shutter tensioning mechanism but also to control the mirror driving, diaphragm presetting and EE charging operations. In this respect, it is desirable to prevent the above-mentioned magnetic force from being applied to the single operating member through the film winding and shutter tensioning mechanism.

SUMMARY OF THE INVENTION

Accordingly, it is the general object of the invention to eliminate the above-mentioned drawbacks and to provide an improved film winding and shutter tensioning mechanism for a photographic camera which occupies a smaller space than was previously necessary, and which can be operated without suffering from the counteraction of the magnet.

To achieve this, the present invention includes an increased number of complementary camming surfaces arranged at interconnection between the single operation member and the motion transmitting member to effect an increase in the amount of motion transmitted therethrough without imparting substantial increase in dimensions to the mechanism, and the provision made at the motion-transmitting member for controlling the magnet so as not to apply any counter-force to the single operating member.

BRIEF DESCRIPTION OF THE INVENTION

The invention is disclosed in more detail in the following description and illustrated in the drawings in a preferred embodiment by ways of example. In the drawings.

DESCRIPTION OF THE PREFERRED EMBODIMENTS

Figure 1:
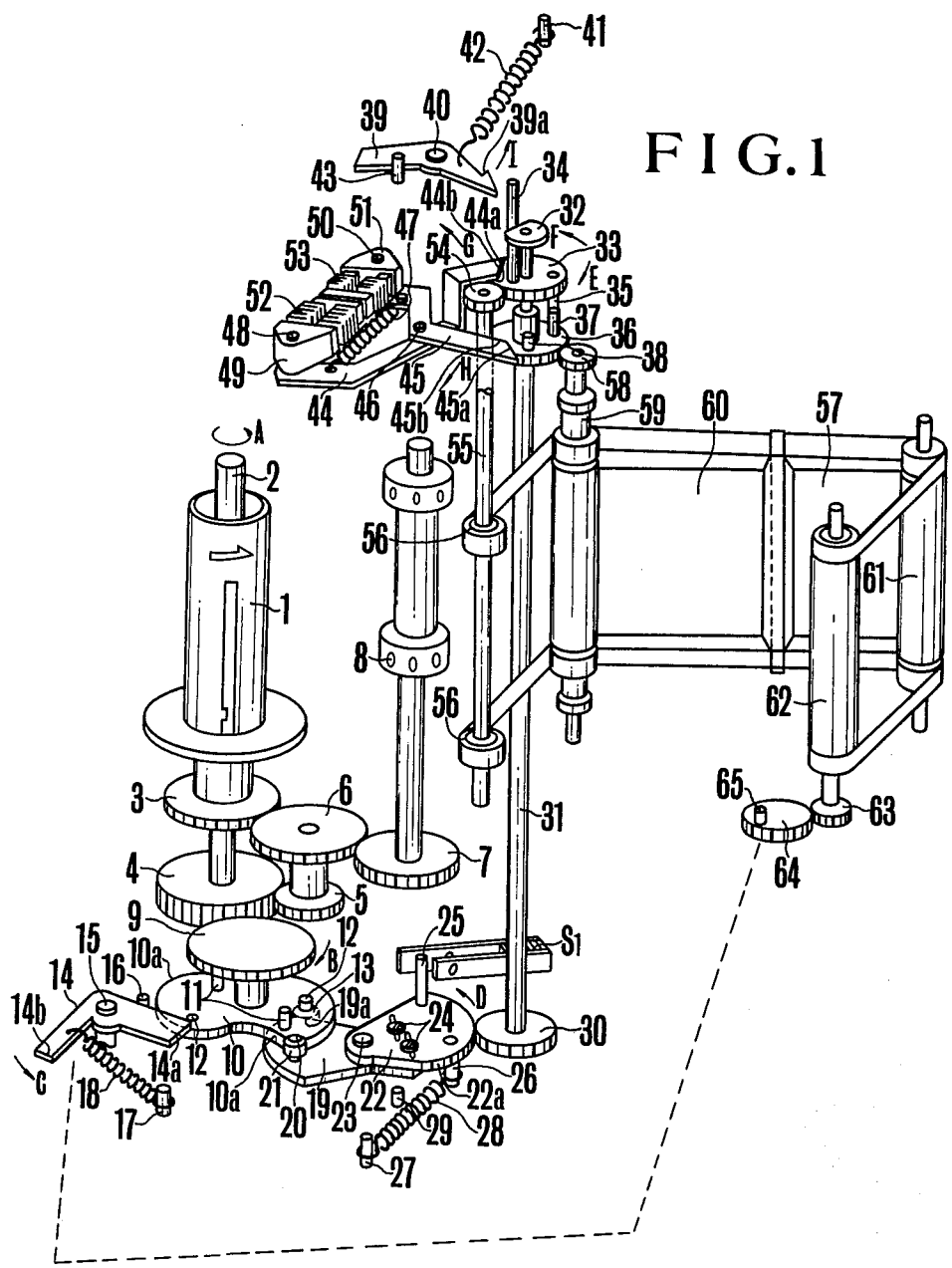
FIG. 1 is an exploded perspective view of an example of a preferred embodiment of a film winding and shutter tensioning mechanism having an interconnecting mechanism according to the present invention as applied to camera of the type described and having a two-curtain type focal plane shutter.

Referring to FIG. 1, there is shown a preferred embodiment of a film winding and shutter tensioning mechanism having a novel interconnecting device according to the present invention as adapted for use with a two-curtain type focal plane shutter cooperating with an electromagnetically controllable shutter release actuator.

The film winding mechanism for advancing the film one frame for exposure comprises a take-up spool 1 mounted for rotation with respect to a shaft 2 having a film winding lever not shown connected through a one-way clutch to one end thereof for rotating shaft 2 in a counter-clockwise direction A only as viewed in FIG. 1, the opposite end of which is coaxially connected to a drive gear 4, a pinion 5 meshing with gear 4 and fixedly mounted on a common shaft of a gear 6, a gear 3 meshing with gear 6 and fixedly mounted on a sleeve which is rotatably mounted on the shaft 2 and which is friction-connected to the take-up spool 1, and a gear 7 fixedly mounted on the shaft of a film advancing sprocket 8.

The interconnecting device of the invention includes a gear 9 meshing with the gear 4, a cam disc coaxially affixed to the common shaft of gear 9 having a pair of pins 11 fixedly mounted on the upper surface thereof and symmetrically arranged with respect to the axis of cam disc 10 and having a pair of pins 12 with rollers 13 mounted for rotation about the respective pins 12 on the lower surface thereof and symmetrically arranged with respect thereto, and a two-armed lever 14 which is pivoted at a pin 15 and of which one arm is connected by a spring 18 to a pin 17 fixedly mounted to the camera housing not shown to urge lever 14 for rotation in a counter-clockwise direction C so that when the other arm of lever 14 abuts a pin 16 fixedly mounted to the camera housing, its lever end 14a extends into the path of travel of pins 11, the parts 10 through 18 serving to control the rotation of the single operating member 2, 4 to a predetermined extent and constituting part of the motion transmitting mechanism between the single operating member and the shutter tensioning mechanism. The interconnecting device further includes a sector plate 19 which is swingable at its apex about a pin 23 fixedly mounted in the camera housing, which has a roller 21 rotatable about a pin 20 extending upward from the upper surface thereof and arranged to constitute a first cam arrangement together with the camming surface 10a of cam disc 10, and which has a camming surface 19a formed in a portion of the periphery thereof at such a location as to constitute a second cam arrangement together with either of the pair of cam follower rollers 13, and a sector gear 22 which is swingable at its apex about the pin 23 in unison with sector plate 19 rigidly connected thereto by a pair of rivets 24, which has an upwardly extending pin 25 elongated to serve as an actuator for an associated switch $S_1$, and which has a downwardly extending pin 26 to which one end of a return spring 28 is attached, the opposite end of which is attached to a pin 27 fixedly mounted in the camera housing for tending to turn sector plate 19 and sector gear 22 assembly about the common pin 23 in a clockwise direction opposite to direction D to the normal extent determined by a stop pin 29 fixedly mounted in the camera housing.

The shutter tensioning mechanism comprises a gear 30 meshing with the toothed portion 22a of sector gear 22 and fixedly mounted on one end of a shaft 31, the opposite end of which has a pawl disc 32 fixedly mounted thereon.

The shutter mechanism comprises a focal plane shutter having front and rear curtains 57 and 60 respectively movable relative to each other to expose the film for a preselected or computed period of time. On the upper and lower sides of the left border of front curtain 57 which is wound on a spring powered winding drum 61 when the shutter is released, there are tapes, the ends of which are wound on two winding drums 56 which are fixedly mounted on a common shaft 5. The rear curtain 60 which is wound on a drum 59 when the shutter is tensioned, has two tapes on the upper and lower sides of the right border thereof which are windable on a spring powered winding drum 62 fixedly mounted on a shaft having a gear 63 fixedly mounted on the lower end thereof in mesh with a gear 64 having an eccentric pin 65 cooperative with lever end 14b through a suitable mechanical linkage indicated by dashed lines to move away the other lever end 14a from the path of travel of pins 11 when the rear curtain is released to terminate the exposure, thereby it being made possible to carry out the next film winding operation. The shaft 55 of front curtain 57 has a pinion 54 fixedly mounted on the upper end thereof and meshing with a front curtain release control master gear 33 which is rotatably mounted on the shaft 31 of the shutter tensioning mechanism. Fixedly mounted on the upper end of the shaft of rear curtain winding drum 59 is a pinion 58 meshing with a rear curtain release control master gear 36 which is rotatably mounted on the shaft 31. A pin 34 protruding upward from front curtain master gear 33 is arranged to coact with the pawl disc 32, and a pin 35 protruding downwardly from this gear 33 is arranged to coact with a pin 27 protruding from rear curtain master gear 36. In order to hold the shutter with front and rear curtain master gears 33 and 36 in a tensioned position, there is provided a pawl lever 39 pivoted at a pin 40 and biased in a counter-clockwise direction I by a spring 42 of which the opposite end is attached to a pin 41 fixedly mounted in the camera housing, and which tends to bring its pawl 39a into engagement with pin 34 when the shutter is tensioned. The couter-clockwise movement of lever 39 is limited to an extent determined by a stop pin 43. The electromagnetically controllable shutter release actuator is constructed as comprising a front curtain latching lever 44 and a rear curtain latching lever 45, the parts 44 and 45 being pivoted at a common pin 46 fixedly mounted in the camera housing and being biased by a common spring 47 to urge the tapered surfaces 44a and 45a of levers 44 and 45 for latching engagement with pin 34 on the front curtain master gear 33 and a pin 38 on the rear curtain master gear 36 respectively. The levers 44 and 45 are further provided with sliding surfaces 44b and 45b formed in peripheral portions adjacent the tapered surface 44a and 45a to interact with pins 34 and 38 respectively at an intermediate shutter tensioning operation. The opposite end portions of levers 44 and 45 carry respective armatures 49 and 51 movably mounted on respective pins 48 and 50 fixedly mounted on lever 44 and 45 respectively, these parts 49 and 51 cooperating with the solenoids of front and rear curtain release control electromagnets 52 and 53 respectively.

Figure 2:
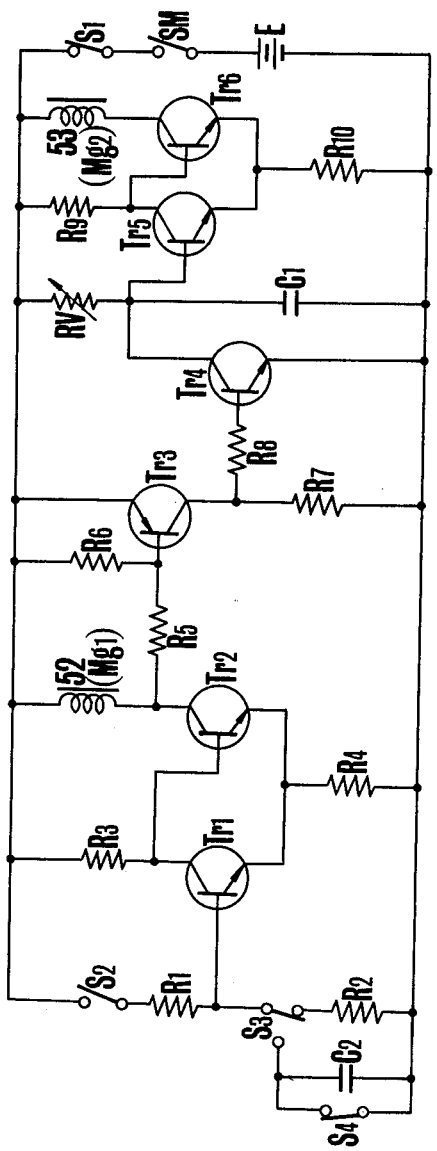
FIG. 2 is a circuit diagram of a control device for a pair of electromagnets associated with the mechanism of FIG. 1.

FIG. 2 shows an example of the control device for the solenoids of electromagnets 52 and 53 of FIG. 1 which includes a first Schmitt type trigger circuit responsive to switches $S_2$ and $S_3$ for energizing the solenoid of the front curtain release actuation control electromagnet 52, an amplifier circuit, a timing circuit, and a second Schmitt type trigger circuit responsive to the timing circuit for energizing the solenoid of the rear curtain release actuation control electromagnet 53, each of which is connected between the positive bus connected through series-connected switch $S_1$ of FIG. 1 and a main switch SM to the positive terminal of a battery E and the negative bus connected to the negative terminal thereof.

The first tigger circuit comprises a transistor $Tr_1$ having a base electrode connected to an interconnection between bias resistors $R_1$ and $R_2$, having a collector electrode connected through a load resistor $R_3$ to the positive bus and having an emitter electrode connected to a common emitter resistor $R_4$, and a transistor $Tr_2$ having a base electrode connected to the collector electrode of transistor $Tr_1$, having an emitter electrode connected through the common emitter resistor $R_4$ to the negative bus, and having a collector electrode connected to the positive bus through the solenoid 52. The amplifier circuit comprises a transistor $Tr_3$ having a base electrode connected through a resistor $R_5$ to the collector electrode of transistor $Tr_2$ and connected through a bias resistor $R_6$ to the positive bus, having collector electrode connected to the positive bus, and having an emitter electrode connected through an emitter resistor $R_7$ to the negative bus, and a transistor $Tr_4$ having a base electrode connected to the emitter electrode of transistor $Tr_3$, having an emitter electrode connected to the nagative bus and having the collector electrode connected to an interconnection between a variable resistor RV and a capacitor $C_1$, the parts RV and $C_1$ constituting the timing circuit connected between the positive and negative buses. The resistance of variable resistor RV is adjusted in accordance with the preselected shutter speed.

The second trigger circuit comprises a transistor $Tr_5$ having a base electrode connected to the interconnection of the timing circuit, a collector electrode connected through a load resistor $R_9$ to the positive bus, and an emitter electrode connected through a common emitter resistor $R_{10}$ to the negative bus, and a transistor $Tr_6$ having a base electrode connected to the collector electrode of transistor $Tr_5$, having an emitter electrode connected through the common resistor $R_{10}$ to the negative bus, and having a collector electrode connected to the positive bus through the solenoid 53. The control device further includes a self-timer condenser $C_2$ connected across resistor $R_2$ through switch $S_3$, and a start switch $S_4$ connected across condenser $C_2$.

The operation of the mechanisms of FIG. 1 is as follows. When the shutter is in its tensioned position after completion of an exposure, the lever 14 is in its extreme counter-clockwise position where the left hand lever arm abuts the stop pin 16 with the lever end 14a abuttingly engaging either of the pair of pins 11 to prevent the double predetermined motions of the single operating member 2, 4. When the shutter is in its unwound condition after completion of an exposure, the lever 14 is caused by means of a pin 65 on gear 65 to assume its extreme clockwise position where the lever end 14a is retracted from the path of travel of the pins 11 permitting for cam disc 10 to be turned in direction B through exactly half of one revolution by the predetermined motion of the single operating member. The mechanisms of FIG. 1 are assumed to be in an intermediate shutter tensioning operation. The camera operator is operating with the not shown film winding lever to turn shaft 2 in direction A, thereby the take-up spool 1 is being rotated through the gear train 4, 5, 6 and 3 to wind up the film advanced by the sprocket 8 which is being rotated by the gear train 4 through 7, and at the same time the rotational motion of shaft 2 is being transmitted to the cam disc 10 to turn it in direction B until exactly half of one revolution thereof is effected. As cam disc 10 is turned in direction B, the turning movement of cam disc 10 is transmitted through the first cam arrangement with the cam follower 21 and one of the camming surfaces 10a to the swingable sector plate 19 and sector gear 22 assembly to turn it in direction D against the force of spring 28. Such counter-clockwise movement of sector gear 22 is applied to the shutter tensioning mechanism 30, 31 and 32 causing a clockwise movement of front curtain master gear 33 in engagement at pin 34 with the pawl of pawl disc 32, and also causing a clockwise movement of rear curtain master gear 36 in abutting engagement of pin 35 with pin 37, which in turn cause counter-clockwise rotations of pinions 54 and 58 to wind up the front and rear curtains 57 and 60 on winding drums 56 and 59 respectively. As the cam disc 10 is further turned to an intermediate angular position in the course of the shutter tensioning operation, the first cam arrangement is dissolved away, and instead the second cam arrangement with cam follower 13 and camming surface 19a of sector plate 19 is established through which the motion of cam disc 10 is seccessively transmitted to the sector plate 19. The switching arrangement with switch $S_1$ and its actuator pin 25 is rendered effective to open switch $S_1$ when the sector gear 22 is turned in direction D from the extreme clockwise position by a relatively small angular distance, so that even when the main switch SM is closed, the solenoids 52 and 53 are prevented from being energized in order to insure that an additional torque due to the energization of the solenoids 52 and 53 is not applied to the single operating member 4, or otherwise in addition of the force of the spring 47, a certain amount of force of the energized solenoids 52 and 53 would be imparted to levers 44 and 45 of which the sliding surfaces 44b and 45b are brought into abutting engagement with pin 34 on the front curtain master gear 33 and with pin 38 on the rear curtain master gear 36 respectively just before the gears 33 and 36 are latched by the tapered surfaces 44a and 45a of levers 44 and 45 respectively. When the pin 34 on the gear 33 is latched by pawl 39a of latching lever 39, the shutter is set in its tensioned position, and at the same time, the second cam arrangement is dissolved away causing the sector plate 19 and sector gear 22 assembly to be turned in the clockwise direction under the force of spring 28 until it abuts the stop pin 29, thereupon switch $S_1$ is again closed, and the shutter tensioning mechanism is reset to the initial position to disengage the pawl disc 32 from the pin 34. Upon completion of the shutter tensioning operation, the lever end 14a is permitted to enter the path of travel of pins 11 so that after the completion of the shutter tensioning operation, the cam disk 10 is further turned until the opposite pin 11 to that which was engaged with the lever end 14a before the initiation of the shutter tensioning operation is brought into abutting engagement with the lever end 14a, thereby establishing exactly half of one revoulstion of cam disc 10, and accordingly the advancement of the film through the space of exactly one frame.

The shutter mechanism of FIG. 1 with the control circuit of FIG. 2 operates in the following manner:

After the shutter tensioning operation is completed, the camera operator turns on the main switch SM to energize the solenoids 52 and 53. Next, the shutter release button not shown is depressed to move a not shown reflex mirror from its viewing position to its non-viewing position, and simultaneously to turn the latch lever 39 in the clockwise direction opposite to direction I against the force of spring 42, thereby the lever pawl 39a is disengaged from pin 34 while the front and rear curtain master gears 33 and 36 being still held in the latched positions by engagement at pins 34 and 38 with the lever ends 44a and 45a respectively. Just before the mirror is set in the non-viewing position, switch $S_2$ is closed to turn on and off transistors $Tr_1$ and $Tr_2$ of the first trigger circuit respectively to deenergize the solenoid 52, thereupon the front curtain 57 is permitted to run down under the force of the spring in the front curtain winding drum 61 which is stronger than spring 47, while rotating the drum 56 with its shaft 55 and pinion 54 which in turn rotates gear 33 in the counter-clockwise direction F against the force of spring 47 applied through lever 44 to the pin 34. As a result, the shutter is opened in synchronism with the termination of the mirror-up movement. In a time interval depending upon the resistance of variable resistor VR and the capacitance of condenser $C_1$, the transistors $Tr_5$ and $Tr_6$ of the second trigger circuit are turned on and off respectively to deenergize the solenoids 53 for the rear curtain release actuation control electromagnet, thereupon the rear curtain 60 is permitted to run down under the force of the spring in the rear curtain winding drum 62 which is stronger than the spring 47, while rotating the drum 59 with its shaft and pinion 58 which in turn rotates gear 36 in the counter-clockwise direction F against the force of spring 47 applied through lever 45 to the pin 38 to thereby terminate the exposure.

Figure 3:
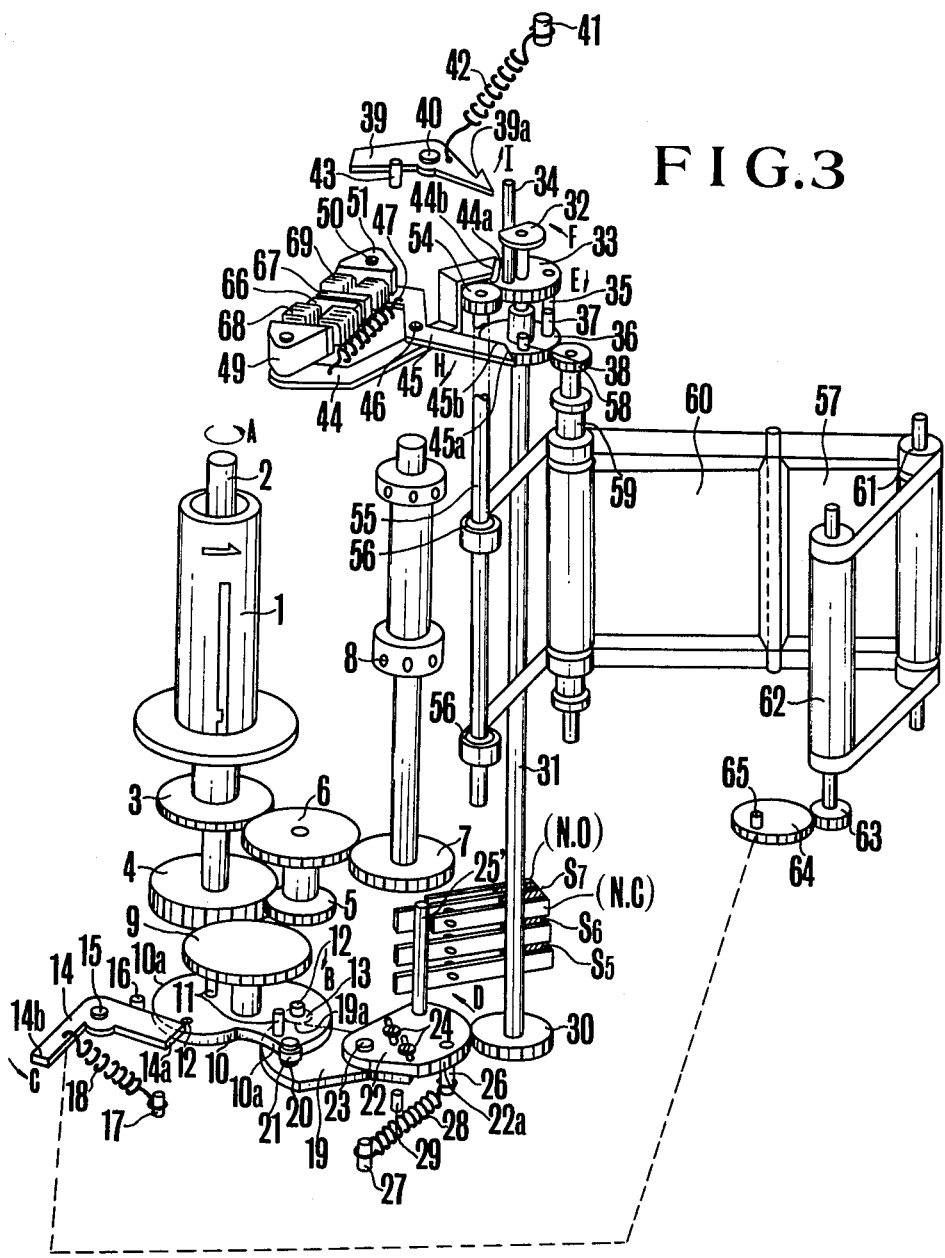
FIG. 3 is an exploded perspective view of another example of the embodiment of the invention in which a pair of permanent magnets assembled with respective solenoids are employed in place of the electromagnets of FIG. 1.

FIG. 3 shows another example of the preferred embodiment of the invention, in which a pair of permanent magnets 66 and 67 are employed in place of the electromagnets 52 and 53 of FIG. 1. In FIG. 3, the parts designated by numeral characters 1 through 24 and 26 through 65 are identical in construction and action to those designated by the same characters in FIG. 1, and the part designated by 25' is a slight modification of part 25. The permanent magnets 66 and 67 are provided with respective solenoids 68 and 69. Switches $S_5$ and $S_6$ are arranged to be closed at a time during the shutter tensioning operation, and switch $S_7$ is arranged to be set from its N.C position to its N.O position at the time during the shutter tensioning operation.

Figure 4:
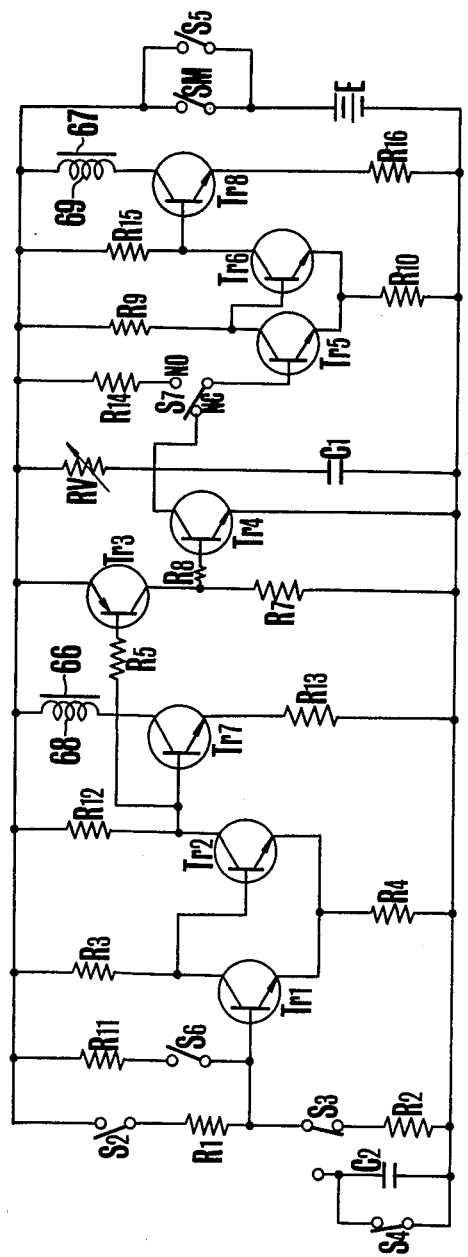
FIG. 4 is a circuit diagram of a control device for the solenoids of FIG. 3.

FIG. 4 is an electrical circuit adapted for use with the shutter release actuation control solenoids associated with the permanent magnets of FIG. 3. The same numerals are employed in FIG. 4 to denote parts of the circuit of FIG. 2. Transistors $Tr_1$, $Tr_2$ and $Tr_3$ and resistors $R_3$, $R_4$, $R_{12}$ and $R_{13}$ constitute a Schmitt type trigger circuit for the front curtain release actuation control solenoid 68, while transistors $Tr_5$ and $Tr_6$ and $Tr_8$ and resistors $R_9$, $R_{10}$, $R_{14}$, $R_{15}$ and $R_{16}$ constitute a Schmitt type trigger circuit for the rear curtain release actuation control solenoid 69.

The operation of the mechanisms of FIG. 3 is as follows. In a manner similar to that shown in connection with FIG. 1, the film winding lever is operated to initiate the winding up of the film advanced by the sprocket 8. As the sector gear 22 is rotated in direction D, switches $S_5$ and $S_6$ are simultaneously turned on by the pin 25' fixedly mounted on the sector gear 22, and switch $S_7$ is set from N.C position to N.O position. When switches $S_5$ and $S_6$ are closed, transistors $Tr_1$ and $Tr_2$ drive transistor $Tr_7$ to energize the solenoid 68 for the front curtain release actuation control magnet 66, while when switch $S_7$ is set in N.O position, transistors $Tr_5$ and $Tr_6$ drive transistor $Tr_8$ to energize the solenoid 69 for the rear curtain release actuation control magnet 67. The solenoids 68 and 69 are designed and oriented so that the magnetic field of each permanent magnet 66 or 67 is cancelled by that of the respective energized solenoid 68 or 69. Therefore, no force other than that of spring 47 is applied to levers 44 and 45 to reduce the film winding torque when the pins 34 and 38 on gears 33 and 36 are moved in sliding engagement with the surfaces 44a and 45a. When the shutter tensioning operation has been completed, the sector gear 22 is returned to the initial position, thereupon switches $S_5$ and $S_6$ are turned off under the action of their own elastic forces, and switch $S_7$ also is set from N.O position to N.C position under the action of its own elastic force to deenergize solenoids 68 and 69. Upon deenergization of solenoids 68 and 69, the permanent magnets 66 and 67 attract their respective armatures 49 and 51 to hold the master gears 33 and 36 in their latched positions. After that, the cam disc 10 is further rotated in a manner similar to that described in connection with FIG. 1 to advance the film exactly one frame.

The shutter mechanism of FIG. 3 with its control circuit of FIG. 4 operates in the following manner:

After the shutter tensioning operation has been completed, the camera operator turns on the main switch SM to render operative the control circuit of FIG. 4. Next, the shutter release button is depressed to actuate the mirror drive mechansim not shown and to turn the latch lever 39 in the counter-clockwise direction opposite to direction I against the force of spring 42, thereby the lever pawl 39a is disengaged from pin 34 on the front curtain master gear 33. In this stage, the front and rear curtain master gears 33 and 36 are held in the latched positions by the tapered lever ends 44a and 45a under the force of spring 47 and under the action of permanent magnets 66 and 67. Just before the mirror is set in the non-viewing position, switch $S_2$ is turned on to drive transistor $Tr_7$ through transistors $Tr_1$ and $Tr_2$, thereby the solenoid 68 is energized to cancel out the action of the permanent magnet 66, and the front curtain 57 is permitted to run down in a manner similar to that described in connection with FIG. 1. In a time interval depending upon the preselected resistance of variable resistor VR and the capacitance of condenser $C_1$ after the running down of the front curtain, the transistor $Tr_8$ is rendered conducting to energize the rear curtain release actuation control solenoid 69, causing the rear curtain to run down, thereupon the exposure is terminated. It will be appreciated that the shutter release actuation control system of the invention assists in ensuring the accurate control of the shutter mechanism for making successive exposures based on the fact that the magnetic force of the drive means for the shutter release actuator is eliminated each time the shutter tensioning operation is performed. The present invention has been described in connection with a particular example of application to the focal plane shutter. But it is to be understood that the effectiveness of the invention is not diminished in application to other type shutters such as lens shutters.

Figure 5:
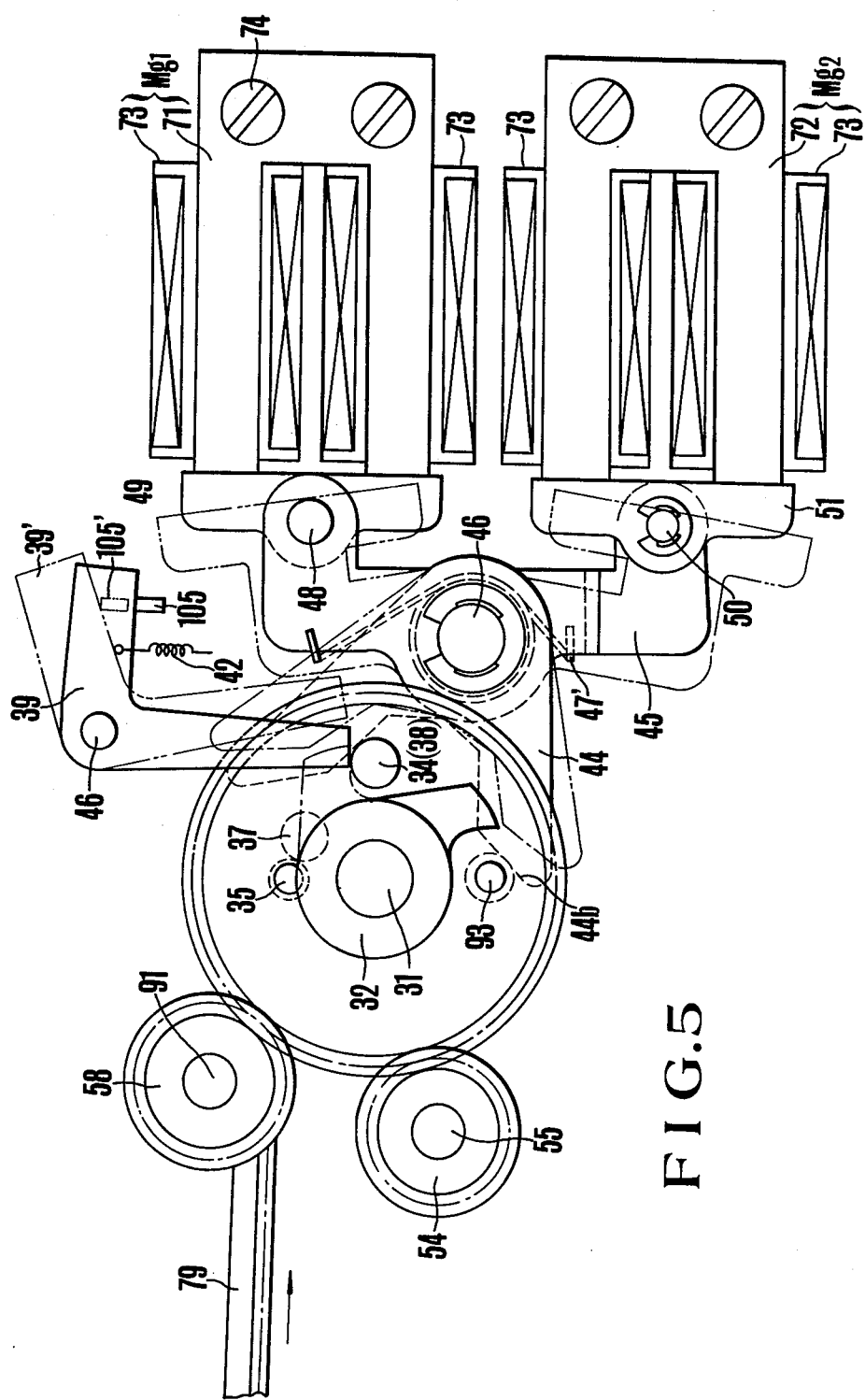
FIG. 5 is a schematic top view illustrating a modification of an electromagnetic shutter release actuator usuable in the present invention.
Figure 6:
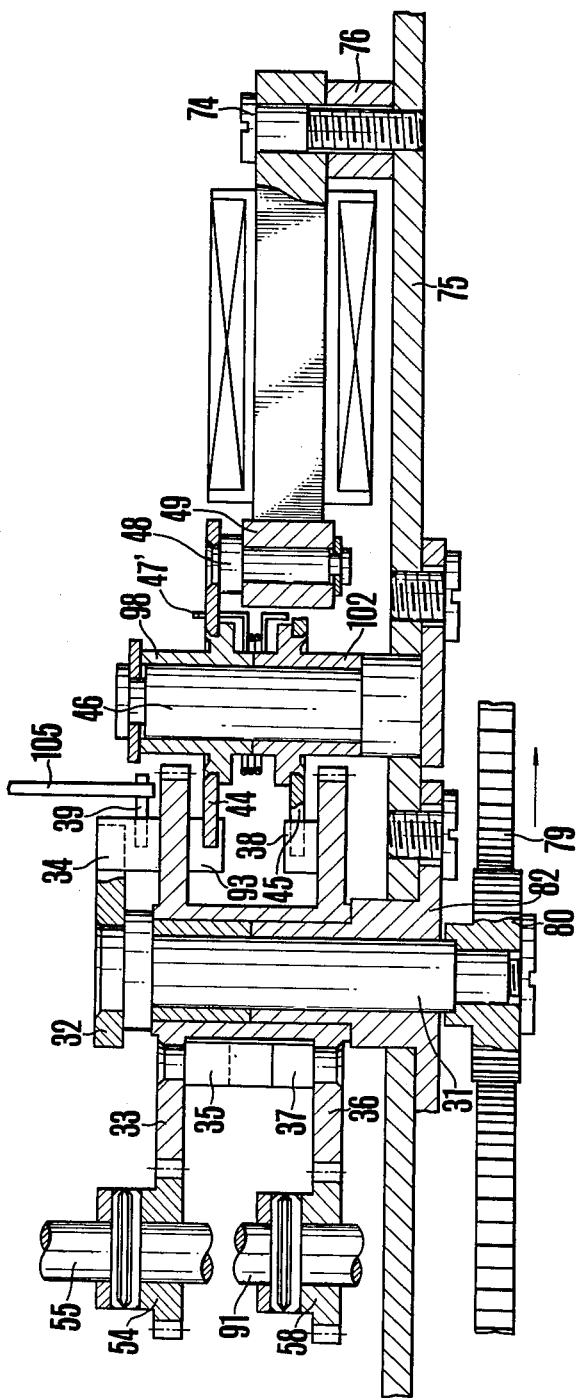
FIG. 6 is a sectional view of the actuator of FIG. 5.

In FIGS. 5 and 6, there is shown a modification of the electromagnetically controllable shutter release actuator for a two-curtain type focal plane shutter. The front and rear curtain control master gears 33 and 36 are rotatably mounted on a common shaft 31 of the shutter tensioning mechanism. The shaft 31 is journalled in a pair of shaft mounts 82 fixedly mounted in the camera housing 75. Gear 33 has an upwardly extending pin 34 arranged to be engageable with the pawl of a pawl disc 32 fixedly mounted on one end of shaft 31, the opposite end of which has a pinion 80 fixedly mounted thereon to mesh with a rack 79 connected to the film winding shaft not shown. When the film winding shaft is rotated to move the rack 79 in a direction indicated by the arrow, the pawl disc 32 rotates the front curtain master gear 33 in the clockwise direction in engagement with pin 34. Such clockwise rotation of gear 33 causes a counter-clockwise rotation of pinion 54 meshing therewith, and also causes a clockwise rotation of gear 36 in engagement of a pin 35 fixedly mounted on the lower side of gear 33 with a pin 37 fixedly mounted on the upper side of gear 36, which in turn causes a counter-clockwise rotation of pinion 58 meshing with gear 36, until the gears 33 and 36 are latched by a latching lever 39 which is pivoted at a pin 46 and which is biased by a spring 42 in the clockwise direction. After the shutter tensioning operation is completed, the film winding lever is returned to its initial position to move the rack 79 in the opposite direction to that indicated by the arrow and to return the pawl disc 32 to the initial position illustrated by the solid lines in FIG. 5. An actuating member for the latching lever 39 is indicated at 105 which is arranged to cooperate with the mirror drive mechanism in such a manner that when the mirror is in its viewing position it assumes a position indicated by the solid lines, while when the mirror is in its non-viewing position, it assumes a position indicated by dashed lines 105', where the latching lever 39 is out of the path of travel of pin 34.

The front and rear curtain release control master gears 33 and 36 are provided respectively with release levers 44 and 45 which are arranged so that lever ends 44b and 45b are engaged with pins 93 and 98 on gears 33 and 36 when the shutter is in a tensioned position, which are rotatably mounted through sleeves 98 and 102 on a common pivotal pin 46 fixedly mounted on the camera housing 75, and which are biased by a common spring 47 to urge armatures 49 and 51 mounted on the opposite end portions 44a and 45a of levers 44 and 45 at shafts 48 and 50 toward their respective electromagnets $Mg_1$ and $Mg_2$. Each of the electromagnets $Mg_1$ and $Mg_2$ comprises a solenoid in a bobbin 73 mounted on a yoke 71 or 72 which is connected by a pair of screws 74 to the camera housing 75 through a spacer 76.

The operation of the mechanism of FIGS. 5 and 6 is as follows. As mentioned before, while switch $S_1$ is closed, the shutter release button not shown is depressed to close switch SM of FIG. 2, thereby the two electromagnets $Mg_1$ and $Mg_2$ are energized to attract their respective armatures 49 and 51 and to hold master gears 33 and 36 in the latched positions. At the same time, the mirror drive mechansim is actuated, while the latching lever 39 being turned by the actuating member 105 to the angular position indicated by 39' against the force of spring 42 to disengage from pin 34 on gear 33. In this stage, the gear 33 is latched by release lever 44 yet. When the mirror is set in its non-viewing position, switch $S_2$ operatively connected to the mirror mechanism is turned on to deenergize electromagnet $Mg_1$ in a manner similar to that described in connection with FIG. 1 or 3. Upon deenergization of magnet $Mg_1$, the release lever 44 which has so far held the gear 33 in the latched position against the force of the spring of the front curtain winding drum is caused to turn in the counter-clockwise direction against the force of spring 47' as the pin 93 is rotated, permitting the front curtain to run down to initiate an exposure. In synchronism with the closure of switch $S_2$, the timing circuit containing the variable resistor VR and condenser $C_1$ is rendered operative to produce a trigger signal in a time interval after the initiation of the exposure. Upon advent of the trigger signal, the trigger circuit deenergizes the second electromagnet $Mg_2$ causing the release lever 45 to be turned in the clockwise direction by means of the pin 38, thereby the rear curtain is permitted to run down to terminate the exposure. When the running down of the rear curtain has been completed, the mirror is set to the viewing position by a mechanism known in the art, and the actuating member 105 is returned to its initial position. At the same time, switch $S_2$ is turned off, and the main switch SM which has so far been closed is opened in response to the setting of the mirror to the viewing position. The shutter release actuation control system in the embodiment of the invention has been described and illustrated as being associated with a manual exposure control system, but may be associated with an automatic exposure control system employing a light sensor responsive to the level of brightness of an object being photographed.

What is claimed is:

1. A camera of the type having an electromagnetically controllable shutter release mechanism including latching means arranged to hold shutter release means in a shutter-tensioned position, magnet means cooperative with said latching means upon actuation thereof to release it from the latching position to the releasing position, a control circuit for electromagnetically controlling the operation of said magnet means, and film winding and shutter tensioning mechanisms which are operatively connected to each other by a single operating member, said film winding mechanism comprising:
   (a) drive means arranged to be rotatable in only one direction in response to a predetermined motion of the single operating member;
   (b) reciprocative rotary means arranged to be turned in a direction for bringing said shutter release means to the latched position, and after completion of the shutter tensioning operation to be turned in the opposite direction to the starting position;
   (c) swingable means engaging with said rotary means and arranged to be brought into engagement with said drive means during a rotation of said drive means to a predetermined angular extent for transmitting the motion of the single operating member to said rotary means to effect the setting of said shutter release means to the latched position, and after completion of the shutter tensioning operation, to be returned in disengagement with said drive means;

said swingable means being provided with an actuator positioned adjacent a switch of said control circuit so that during the shutter tensioning operation said switch is opened to eliminate the force of said magnet means; and wherein said drive means and said swingable means are provided with first and second cam arrangements made at the interconnection therebetween and complementary with each other so that as soon as the first cam arrangement is disengaged, the second cam arrangement is established through which the motion of said drive means is transmitted to said swingable means.

2. A camera according to claim 1, wherein said drive means has a camming surface constituting part of said first cam arrangement and has a cam follower constituting part of said second cam arrangement; said swingable means has a cam follower constituting part of said first cam arrangement and has a camming surface constituting part of said second cam arrangement.

3. A camera of the type having an electromagnetically controllable shutter release mechanism including latching means arranged to hold shutter release means in a shutter-tensioned position, magnet means cooperative with said latching means upon actuation thereof to release it from the latching position to the releasing position, a control circuit for electromagnetically controlling the operation of said magnet means, and film winding and shutter tensioning mechanisms which are operatively connected to each other by a single operating member, said film winding mechanism comprising:
   (a) drive means arranged to be rotatable in only one direction in response to a predetermined motion of the single operating member;
   (b) reciprocative rotary means arranged to be turned in a direction for bringing said shutter release means to the latched position, and after completion of the shutter tensioning operation to be turned in the opposite direction to the starting position;
   (c) swingable means engaging with said rotary means and arranged to be brought into engagement with said drive means during a rotation of said drive means to a predetermined angular extent for transmitting the motion of the single operating member to said rotary means to effect the setting of said shutter release means to the latched position, and after completion of the shutter tensioning operation, to be returned in disengagement with said drive means;

said swingable means being provided with an actuator positioned adjacent a switch of said control circuit so that during the shutter tensioning operation said switch is opened to eliminate the force of said magnet means; and wherein said magnet means includes a first electromagnet for controlling the operation of a front curtain release member and a second electromagnet for controlling the operation of a rear curtain release member, said electromagnets being connected to said control circuit upon completion of the shutter tensioning operation to be energized to hold said release members in the latched positions and upon operation of said control circuit in response to the shutter release actuation to be deenergized to release the front and rear curtains in sequence from their tensioned positions.

4. A camera of the type having an electromagnetically controllable shutter release mechanism including latching means arranged to hold shutter release means in a shutter-tensioned position, magnet means cooperative with said latching means upon actuation thereof to release it from the latching position to the releasing position, a control circuit for electromagnetically controlling the operation of said magnet means, and film winding and shutter tensioning mechanisms which are operatively connected to each other by a single operating member, said film winding mechanism comprising:

(a) drive means arranged to be rotatable in only one direction in response to a predetermined motion of the single operating member;

(b) reciprocative rotary means arranged to be turned in a direction for bringing said shutter release means to the latched position, and after completion of the shutter tensioning operation to be turned in the opposite direction to the starting position;

(c) swingable means engaging with said rotary means and arranged to be brought into engagement with said drive means during a rotation of said drive means to a predetermined angular extent for transmitting the motion of the single operating member to said rotary means to effect the setting of said shutter release means to the latched position, and after completion of the shutter tensioning operation, to be returned in disengagement with said drive means;

said swingable means being provided with an actuator positioned adjacent a switch of said control circuit so that during the shutter tensioning operation said switch is opened to eliminate the force of said magnet means; and wherein said magnet means includes a first permanent magnet associated with a solenoid for controlling the operation of a front curtain release member and a second permanent magnet associated with a solenoid for controlling the operation of a rear curtain release member, said first and second solenoids being so designed and oriented with respect to their respective magnets that when said control circuit energizes said solenoids, the forces of the permanent magnets are cancelled out by the counterforces of the energized solenoids.

5. A camera of the type having an electromagnetically controllable shutter release mechanism including a latching means arranged to hold a shutter release means in a shutter-tensioned position, said shutter release means having a rotating path of movement, said latching means being so rotatably supported as to be able to enter into or out of said rotating path of said shutter release means and being biased in a direction for engaging with the shutter release means, said latching means thereby being engaged with said shutter release means during rotation of shutter release means and being thereby rotated against said biasing force; a magnet means cooperative with said latching means upon actuation thereof to release it from the latching position to the releasing position; a control circuit for electromagnetically controlling the operation of said magnet means; a switching means provided within said control circuit to change over said magnet means between a magnetized state and de-energized state; and film winding and shutter tensioning mechanisms which are operatively connected to each other by a single operating member, said film winding mechanism comprising:

(a) a drive means arranged to be rotatable in only one direction in response to a predetermined motion of the single operating member;

(b) a reciprocative rotary means arranged to be turned in a direction for bringing said shutter release means to the latched position, and after completion of the shutter tensioning operation to be turned in the direction opposite to the starting position; and (c) swingable means engaging with said rotary means and being arranged to be brought into engagement with said drive means during a rotation of said drive means to a predetermined angular extent for transmitting the motion of the single operating member to said rotary means to effect the setting of said shutter release means to the latched position, and after completion of the shutter tensioning operation, to be returned in disengagement with said drive means;

said swingable means being provided with an actuator, which is arranged in such manner to actuate the switching means which changes over the magnet means to its de-magnetized state in synchromism with rotation of the latching means by said shutter release means against the biasing force when the swingable means is rotated by the drive means, to thereby tension the shutter through the reciprocative rotary means.

6. A shutter charging device of a camera comprising a rotatable latching means to check a shutter release means driven by a spring at a shutter tensioned position, a magnet means to hold said latching means at its latching position, and a spring means to bias said latching means to a direction contacting with said magnet means so that said shutter release means rotates the latching member against its biasing force when the magnet means releases the holding of the latching means, wherein said shutter charging device further has a shutter tensioning member to at least shift said shutter release means to said shutter tensioned position and to release the engagement between said shutter release means and the shutter tensioning member after shifting the shutter release means to the shutter tensioned position, and a control means to remove the retention force of said magnet means while said shutter release means engages with the latching means to rotate the latching means as it is shifted to its shutter tensioned position.

* * * * *